US009875616B2

(12) United States Patent
Michaelson et al.

(10) Patent No.: US 9,875,616 B2
(45) Date of Patent: *Jan. 23, 2018

(54) FLEXIBLE DETERMINATION OF PROGRESSIVE AWARDS

(71) Applicant: IGT, Las Vegas, NV (US)

(72) Inventors: Richard Michaelson, Reno, NV (US); Connie Louise Thome, Reno, NV (US); Christopher Deacon Reddicks, Reno, NV (US)

(73) Assignee: IGT, Las Vegas, NV (US)

( * ) Notice: Subject to any disclaimer, the term of this patent is extended or adjusted under 35 U.S.C. 154(b) by 279 days.

This patent is subject to a terminal disclaimer.

(21) Appl. No.: 14/729,877

(22) Filed: Jun. 3, 2015

(65) Prior Publication Data

US 2015/0269812 A1    Sep. 24, 2015

Related U.S. Application Data

(60) Continuation of application No. 13/085,361, filed on Apr. 12, 2011, now Pat. No. 9,053,602, which is a
(Continued)

(51) Int. Cl.
*A63F 9/24* (2006.01)
*G07F 17/32* (2006.01)
*G06Q 40/04* (2012.01)

(52) U.S. Cl.
CPC ......... *G07F 17/3258* (2013.01); *G06Q 40/04* (2013.01); *G07F 17/32* (2013.01); *G07F 17/3225* (2013.01); *G07F 17/3276* (2013.01)

(58) Field of Classification Search
USPC ........................................ 463/16–17, 25–27
See application file for complete search history.

(56) References Cited

U.S. PATENT DOCUMENTS 5,042,810 A    8/1991  Williams
5,116,055 A    5/1992  Tracy
(Continued)

FOREIGN PATENT DOCUMENTS

CN    1462943    12/2003
EP    0 342 797    11/1989
(Continued)

OTHER PUBLICATIONS

Mikohn PSP v2.0 Manual Aug. 28, 2001, [retreived on Dec. 12, 2012]. Retreived from the internet; <URL: http://newlifegames.net/nlg/index.php?action=dlattach;topic=10155,0;attach=28244>.
(Continued)

*Primary Examiner* — Masud Ahmed
(74) *Attorney, Agent, or Firm* — Neal, Gerber & Eisenberg LLP

(57) ABSTRACT

The present invention provides novel method and devices for implementing progressive systems on networked gaming machines and associated network devices. Some preferred implementations of the invention allow a target progressive pool size to be selected and apply payouts such that the actual progressive pool size is not likely to exceed greatly the target progressive pool size. Some such implementations control the actual progressive pool size by applying a function to control percentages of the current progressive pool size payable to players of a wagering game on the networked gaming machines. The function may be a function of a current progressive pool size, target progressive pool size and bet size. The function may cause relatively higher percentages of the current progressive pool size to be payable to players when the current progressive pool amount is greater than a target progressive pool size and relatively lower percentages of the current progressive pool size to be
(Continued)

payable to players when the current progressive pool size is less than or equal to a target progressive pool size.

23 Claims, 9 Drawing Sheets

Related U.S. Application Data division of application No. 11/059,973, filed on Feb. 16, 2005, now Pat. No. 7,980,947.

(56) References Cited

U.S. PATENT DOCUMENTS

| | | | |
|---|---|---|---|
| 5,158,293 A | 10/1992 | Mullins | |
| 5,275,400 A | 1/1994 | Weingardt et al. | |
| 5,280,909 A | 1/1994 | Tracy | |
| 5,324,035 A | 6/1994 | Morris et al. | |
| 5,326,104 A | 7/1994 | Pease et al. | |
| 5,344,144 A | 9/1994 | Canon | |
| 5,423,539 A | 6/1995 | Nagao | |
| 5,476,259 A | 12/1995 | Weingardt | |
| 5,560,603 A | 10/1996 | Seeling et al. | |
| 5,645,486 A | 7/1997 | Nagao et al. | |
| 5,655,961 A | 8/1997 | Acres et al. | |
| 5,741,183 A | 4/1998 | Acres et al. | |
| 5,752,882 A | 5/1998 | Acres et al. | |
| 5,766,076 A | 6/1998 | Pease et al. | |
| 5,769,716 A | 6/1998 | Saffari et al. | |
| RE35,864 E | 7/1998 | Weingardt | |
| 5,779,549 A | 7/1998 | Walker et al. | |
| 5,836,817 A | 11/1998 | Acres et al. | |
| 5,851,148 A | 12/1998 | Brune et al. | |
| 5,851,149 A | 12/1998 | Xidos et al. | |
| 5,855,515 A | 1/1999 | Pease et al. | |
| 5,876,284 A | 3/1999 | Acres et al. | |
| 5,885,158 A | 3/1999 | Torango et al. | |
| 5,947,820 A | 9/1999 | Morro et al. | |
| 5,997,400 A | 12/1999 | Seelig et al. | |
| 6,001,016 A | 12/1999 | Walker et al. | |
| 6,012,982 A | 1/2000 | Piechowiak et al. | |
| 6,012,983 A | 1/2000 | Walker et al. | |
| 6,089,980 A | 7/2000 | Gauselmann | |
| 6,099,408 A | 8/2000 | Schneier et al. | |
| 6,110,041 A | 8/2000 | Walker et al. | |
| 6,135,884 A | 10/2000 | Hedrick et al. | |
| 6,142,872 A | 11/2000 | Walker et al. | |
| 6,159,098 A | 12/2000 | Slomiany et al. | |
| 6,162,121 A | 12/2000 | Morro et al. | |
| 6,162,122 A | 12/2000 | Acres et al. | |
| 6,168,520 B1 | 1/2001 | Baerlocher et al. | |
| 6,186,894 B1 | 2/2001 | Mayeroff | |
| 6,190,255 B1 | 2/2001 | Thomas et al. | |
| 6,203,010 B1 | 3/2001 | Jorasch et al. | |
| 6,203,430 B1 | 3/2001 | Walker et al. | |
| 6,224,483 B1 | 5/2001 | Mayeroff | |
| 6,231,445 B1 | 5/2001 | Acres | |
| 6,241,608 B1 | 6/2001 | Torango | |
| 6,244,958 B1 | 6/2001 | Acres | |
| 6,254,483 B1 | 7/2001 | Acres | |
| 6,257,981 B1 | 7/2001 | Acres et al. | |
| RE37,414 E | 10/2001 | Harlick | |
| 6,312,333 B1 | 11/2001 | Acres | |
| 6,319,125 B1 | 11/2001 | Acres | |
| 6,358,149 B1 | 3/2002 | Schneider et al. | |
| 6,364,768 B1 | 4/2002 | Acres et al. | |
| 6,371,852 B1 | 4/2002 | Acres | |
| 6,375,567 B1 | 4/2002 | Acres | |
| 6,375,569 B1 | 4/2002 | Acres | |
| 6,431,983 B2 | 8/2002 | Acres | |
| 6,435,968 B1 | 8/2002 | Torango | |
| RE37,885 E | 10/2002 | Acres et al. | |
| 6,471,591 B1 * | 10/2002 | Crumby | G07F 17/3244 463/25 |
| 6,565,434 B1 | 5/2003 | Acres | |
| 6,589,115 B2 | 7/2003 | Walker et al. | |
| 6,599,193 B2 | 7/2003 | Baerlocher et al. | |
| 6,607,438 B2 | 8/2003 | Baerlocher et al. | |
| 6,626,758 B1 | 9/2003 | Parham et al. | |
| 6,648,757 B1 | 11/2003 | Slomiany et al. | |
| 6,656,052 B2 | 12/2003 | Abramopoulos et al. | |
| 6,712,697 B2 | 3/2004 | Acres | |
| 6,800,030 B2 | 10/2004 | Acres | |
| 6,832,958 B2 | 12/2004 | Acres et al. | |
| 6,869,361 B2 | 3/2005 | Sharpless et al. | |
| 6,887,154 B1 | 5/2005 | Luciano, Jr. et al. | |
| 6,899,625 B2 | 5/2005 | Luciano, Jr. et al. | |
| 6,908,387 B2 | 6/2005 | Hedrick et al. | |
| 6,910,964 B2 | 6/2005 | Acres | |
| RE38,812 E | 10/2005 | Acres et al. | |
| 7,056,215 B1 | 6/2006 | Olive | |
| 7,273,415 B2 | 9/2007 | Cregan et al. | |
| 7,297,059 B2 | 11/2007 | Vancura et al. | |
| 7,651,394 B2 | 1/2010 | Johnson | |
| 7,780,516 B2 | 8/2010 | Gauselmann | |
| 7,931,532 B2 | 4/2011 | Johnson | |
| 8,096,874 B2 | 1/2012 | Nicely et al. | |
| 8,672,743 B2 * | 3/2014 | Walker | G06Q 30/06 273/242 |
| 2001/0004607 A1 | 6/2001 | Olsen | |
| 2002/0071557 A1 | 6/2002 | Nguyen | |
| 2002/0116615 A1 | 8/2002 | Nguyen et al. | |
| 2002/0138594 A1 | 9/2002 | Rowe | |
| 2002/0151354 A1 | 10/2002 | Boesen et al. | |
| 2002/0187834 A1 | 12/2002 | Rowe et al. | |
| 2003/0027625 A1 | 2/2003 | Rowe | |
| 2003/0030211 A1 | 2/2003 | Brown | |
| 2003/0060266 A1 | 3/2003 | Baerlocher | |
| 2003/0060269 A1 | 3/2003 | Paulsen et al. | |
| 2003/0060279 A1 | 3/2003 | Torango | |
| 2003/0148807 A1 | 8/2003 | Acres | |
| 2003/0181231 A1 * | 9/2003 | Vancura | G07F 17/32 463/9 |
| 2003/0216166 A1 | 11/2003 | Baerlocher et al. | |
| 2003/0222402 A1 | 12/2003 | Olive | |
| 2003/0232651 A1 | 12/2003 | Huard et al. | |
| 2004/0009811 A1 | 1/2004 | Torango | |
| 2004/0048644 A1 | 3/2004 | Gerrard et al. | |
| 2005/0119047 A1 | 6/2005 | Olive | |
| 2005/0143168 A1 | 6/2005 | Torango | |
| 2005/0170876 A1 * | 8/2005 | Masci | G07F 17/3267 463/16 |
| 2005/0176488 A1 | 8/2005 | Olive | |
| 2005/0176490 A1 * | 8/2005 | Wright | G06Q 20/045 463/17 |
| 2005/0187014 A1 | 8/2005 | Saffari et al. | |
| 2005/0209004 A1 | 9/2005 | Torango | |
| 2006/0030403 A1 | 2/2006 | Lafky et al. | |
| 2006/0035694 A1 | 2/2006 | Fuller | |
| 2006/0040732 A1 | 2/2006 | Baerlocher et al. | |
| 2006/0073887 A1 | 4/2006 | Nguyen et al. | |
| 2006/0142079 A1 | 6/2006 | Ikehara et al. | |
| 2006/0183535 A1 | 8/2006 | Marks et al. | |
| 2006/0183538 A1 | 8/2006 | Michaelson et al. | |
| 2006/0236116 A1 | 10/2006 | Patel | |
| 2006/0287077 A1 | 12/2006 | Grav et al. | |
| 2007/0054733 A1 | 3/2007 | Baerlocher | |
| 2007/0060271 A1 | 3/2007 | Cregan et al. | |
| 2007/0060320 A1 | 3/2007 | Kelly et al. | |
| 2007/0060321 A1 | 3/2007 | Vasquez et al. | |
| 2007/0066403 A1 * | 3/2007 | Conkwright | A63F 13/10 463/43 |
| 2007/0105620 A1 | 5/2007 | Cuddy et al. | |
| 2007/0184887 A1 | 8/2007 | Cannon | |
| 2007/0202943 A1 | 8/2007 | Thomas | |
| 2007/0213114 A1 | 9/2007 | Caspers et al. | |
| 2007/0218982 A1 | 9/2007 | Baerlocher | |
| 2007/0259709 A1 | 11/2007 | Kelly et al. | |

(56) References Cited

U.S. PATENT DOCUMENTS

2007/0298875 A1 12/2007 Baerlocher et al.
2008/0032782 A1 2/2008 Boesen et al.

FOREIGN PATENT DOCUMENTS

| EP | 1 278 167 | 1/2003 |
|---|---|---|
| GB | 2181589 | 4/1987 |
| WO | WO-00/17825 | 3/2000 |
| WO | WO 02 07836 | 1/2002 |
| WO | WO 2004/060510 | 7/2004 |
| WO | WO 2005 083599 | 9/2005 |
| WO | WO 2005 099425 | 10/2005 |

OTHER PUBLICATIONS

International-type Search Report and Written Opinion regarding Macau Appl. No. I/272, dated Jun. 27, 2013, 10 pages.
First examination report for EP Application No. 06 720 257.2, dated Aug. 22, 2013, 5 pages.
Excerpt from Local Area Electronic Gaming Machine Communications Protocol, QCOM Version 1.5, by Queensland Treasury Office of Gaming Regulation printed Feb. 26, 1998.
Fast Buck Systems Manual, written by International Game Technology, available to Mirage shift supervisors at least as early as May 30, 1990.
Integrated Real Time On-Line Slot System—SDI, written by GRIPS Electronic GmbH, printed from website reported as archived on Feb. 20, 1997 (available at http://web.archive.org/web/19970220165559/www.grips.com/sdi.htm).
PEM—Precision Electronic Meter, written by GRIPS Electronic GmbH, printed from website reported as archived on Feb. 20, 1997 (available at http://web.archive.org/web/19970220165753/www.grips.com/pem.htm).
Progressive Jackpot System article, printed from casinomagazine.com.managearticle.asp@c.sub.--290&a=518, on Jun. 21, 2004.
ProLINK Progressive Controller User/Reference Manual, written by Casino Data Systems, published in Apr. 1997.
Slot Machines a Pictorial History of the First 100 Years (pp. 216, 242 to 243), 5.sup.th edition, written by Marshall Fey, published in 1983-1997.
Wide Area Progressive Link System, written by GRIPS Electronic GmbH, printed from website reported as archived on Feb. 20, 1997 (available at http://web.archive.org/web/19970220165457/www.grips.com/wap.htm).
Canadian Office Action for Application No. 2,597,539 dated Aug. 12, 2016 (9 pages).

* cited by examiner

FLEXIBLE DETERMINATION OF PROGRESSIVE AWARDS

PRIORITY CLAIM

This application is a continuation application of, claims the benefit of and priority to U.S. patent application Ser. No. 13/085,361, filed on Apr. 12, 2011, which is a divisional application of, claims the benefit of and priority to U.S. patent application Ser. No. 11/059,973, filed on Feb. 16, 2005, now U.S. Pat. No. 7,980,947, the entire contents of each are incorporated by reference herein.

FIELD OF THE INVENTION

The present invention relates to networks of gaming machines, such as slot machines and video poker machines. More particularly, the present invention relates to methods and devices for awarding progressive prizes to players of networked gaming machines.

BACKGROUND OF THE INVENTION

Typically, utilizing a master gaming controller, a gaming machine controls various combinations of devices that allow a player to play a game on the gaming machine and also encourage game play on the gaming machine. For example, a game played on a gaming machine usually requires a player to input money or an indicia of credit into the gaming machine, indicate a wager amount, and initiate game play. These steps require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines a game outcome, presents the game outcome to the player and may dispense an award of some type depending on the outcome of the game. The operations described above may be carried out on the gaming machine when the gaming machine is operating as a "stand alone" unit or linked in a network of some type to a group of gaming machines.

As technology in the gaming industry progresses, more and more gaming services are being provided to gaming machines via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and progressive games or prizes. These services and features are provided in addition to the games that are available for play on the gaming machines.

The present invention is primarily directed to methods and devices for implementing progressive prize winning modes, referred to herein as "progressive systems." A progressive system may award a progressive prize in addition to other prizes that may be available due to a game outcome. A progressive system normally includes at least one bank of gaming machines in a particular gaming establishment, such as an individual casino. Each gaming machine has an interface that provides communication between the gaming machine and a central network device, such as a server. The server receives information from each gaming machine regarding, e.g., an indication of play, a wager value, etc. The server determines a progressive pool size (also referred to herein as a progressive pool amount) that accumulates as the gaming machines are played. The accumulated progressive pool amount may be displayed on the participating gaming machines.

The progressive pool continues to accumulate until there is a progressive prize award to a player of a particular gaming machine. In some progressive systems, a percentage of the progressive pool amount may be awarded. Other progressive systems do not allow for a portion of progressive pool amount to be awarded, but instead either the entire progressive pool amount is awarded or no progressive prize is awarded.

Progressive systems have proven to be popular with players of gaming machines and to increase levels of play, particularly when the progressive prize pool becomes large. However, a casino or similar establishment participating in a progressive prize pool may desire to prevent the progressive prize pool from growing too large. Otherwise, the payouts of progressive prizes could produce large and unpredictable changes in cash flow.

In some instances, the progressive system may be a wide area progressive ("WAP") system, for example a WAP system such as that described in U.S. Pat. No. 5,766,076, entitled "Progressive Gaming System and Method for Wide Applicability," which is hereby incorporated by reference in its entirety. If a casino is participating in a WAP system, the payouts of progressive prizes can be very large. Accordingly, WAP systems can amplify the unpredictable changes in cash flow caused by progressive awards. For the foregoing reasons and other reasons, it would be desirable to provide novel progressive systems that address these and other limitations of the prior art.

SUMMARY OF THE INVENTION

The present invention provides novel method and devices for implementing progressive systems on networked gaming machines and associated network devices. Some preferred implementations of the invention allow a target progressive pool size to be selected and apply payouts such that the actual progressive pool size is not likely to exceed greatly the target progressive pool size. Some such implementations control the actual progressive pool size by applying a function to control percentages of the current progressive pool size payable to players of a wagering game on the networked gaming machines. The function may be a function of a current progressive pool size, target progressive pool size and bet size. The function may cause relatively higher percentages of the current progressive pool size to be payable to players when the current progressive pool amount is greater than a target progressive pool size and relatively lower percentages of the current progressive pool size to be payable to players when the current progressive pool size is less than or equal to a target progressive pool size.

Some aspects of the invention provide a method of controlling a progressive pool size for a wagering game. The method includes these steps: selecting a target progressive pool size; applying a function to control percentages of the current progressive pool amount payable to players of the wagering game; and paying out percentages of the current progressive pool amount to players of the wagering game according to the function. The function causes relatively higher percentages of the current progressive pool amount to be payable to players when the current progressive pool amount is greater than a target progressive pool amount and relatively lower percentages of the current progressive pool amount to be payable to players when the current progressive pool amount is less than or equal to a target progressive pool amount The function may be a power function of bet size in the form of $B^p$, where B is a function of the bet size and p is a function of the current progressive pool amount. B may be based, at least in part, on a winning bet size divided by a maximum bet size and p may be proportional to the current progressive pool amount divided by the target progressive pool amount. In some implementations, it is advantageous for the value of p to be greater than 1, but in other implementations p is less than or equal to 1.

Alternatively, the function may be a step function, wherein steps of the step function correspond with predetermined bet sizes. The method may include the step of changing the function according to a reserve size. The function may be a function of the current progressive pool amount, the target progressive pool amount and bet size.

Some implementations of the invention provide another method of controlling a progressive pool size for a wagering game. The method includes the following steps: selecting a target progressive pool size; applying a function of a current progressive pool amount, target progressive pool amount and bet size to control percentages of the current progressive pool amount payable to players of the wagering game; and paying out percentages of the current progressive pool amount to players of the wagering game according to the function. The function may be a function of the current progressive pool amount, the target progressive pool amount and bet size.

A proportionally higher percentage of the current progressive pool amount may be paid out for lower bet sizes when a difference between the current progressive pool amount and the target progressive pool amount is positive and increasing.

The function may be a power function of bet size in the form of where B is a function of the bet size and p is a function of the current progressive pool amount. B may be based in part on a winning bet size divided by a maximum bet size and p may be proportional to the current progressive pool amount divided by the target progressive pool amount. In some implementations, p is greater than 1, but in other implementations p may be less than or equal to 1.

Alternatively, the function may be a step function, wherein steps of the step function correspond with predetermined bet sizes. The method may include the step of changing the function according to a reserve size.

Some embodiments of the invention provide a computer program for controlling a progressive pool size for a wagering game. The computer program can be embodied in a machine-readable medium and includes instructions for controlling at least one device in a gaming network to perform the following steps: receive a target progressive pool size; apply a function to control percentages of the current progressive pool amount payable to players of the wagering game; and pay out percentages of the current progressive pool amount to players of the wagering game according to the function. The function causes relatively higher percentages of the current progressive pool amount to be payable to players when the current progressive pool amount is greater than a target progressive pool amount and relatively lower percentages of the current progressive pool amount to be payable to players when the current progressive pool amount is less than or equal to a target progressive pool amount Alternative embodiments of the invention provide another computer program for controlling a progressive pool size for a wagering game. The computer program can be embodied in a machine-readable medium and includes instructions for controlling at least one device in a gaming network to perform the following steps: receive a target progressive pool size; apply a function of a current progressive pool amount, target progressive pool amount and bet size to control percentages of the current progressive pool amount payable to players of the wagering game; and pay out percentages of the current progressive pool amount to players of the wagering game according to the function.

The computer program may cause a proportionally higher percentage of the current progressive pool amount to be paid out for lower bet sizes when D is positive and increasing, where D is a difference between the current progressive pool amount and the target progressive pool amount.

The function may be a power function of bet size in the form of $B^p$, where B is a function of the bet size and p is a function of the current progressive pool amount. Alternatively, the function may be a step function, wherein steps of the step function correspond with predetermined bet sizes.

Some embodiments of the invention provide a network device (e.g., a progressive server) configured to control a progressive pool size for a wagering game The network device includes the following elements an interface for receiving a target progressive pool size and at least one logic device configured to perform the following steps: applying a function to control percentages of the current progressive pool amount payable to players of the wagering game; and instructing the plurality of gaming machines to pay out percentages of the current progressive pool amount to players of the wagering game according to the function. The function causes relatively higher percentages of the current progressive pool amount to be payable to players when the current progressive pool amount is greater than a target progressive pool amount and relatively lower percentages of the current progressive pool amount to be payable to players when the current progressive pool amount is less than or equal to a target progressive pool amount.

The network device may cause a proportionally higher percentage of the current progressive pool amount to be paid out for lower bet sizes when D is positive and increasing, where D is a difference between the current progressive pool amount and the target progressive pool amount.

The function may be a power function of bet size in the form of $B^p$, where B is a function of the bet size and p is a function of the current progressive pool amount. Alternatively, the function comprises a step function, wherein steps of the step function correspond with predetermined bet sizes.

Some embodiments of the invention provide an alternative network device, such as a progressive server, for controlling a progressive pool size for a wagering game. This network device includes the following elements: at least one logic device for determining a function of a current progressive pool amount, target progressive pool amount and bet size to control percentages of the current progressive pool amount payable to players of the wagering game; and a network interface for instructing gaming machines on a gaming network to pay out percentages of the current progressive pool amount to players of the wagering game according to the function. The network device may also include an input device for receiving the target progressive pool amount.

Alternative implementations of the invention provide a method of apportioning contributions between a main progressive pool and a reserve progressive pool in a gaming network. The method includes the following steps: apportioning a higher percentage of contributions to the reserve progressive pool when the reserve progressive pool is below a threshold level; and apportioning a lower percentage of contributions to the reserve progressive pool when the reserve progressive pool attains the threshold level.

The threshold level may be a reserve progressive pool amount. For example, the threshold level may be attained when the reserve progressive pool amount is greater than zero.

Yet other methods are provided by the present invention for apportioning contributions between a main progressive pool and a reserve progressive pool in a gaming network. One such method includes the following steps: apportioning a higher percentage of contributions to the main progressive pool before a threshold level is attained; and apportioning a lower percentage of contributions to the main progressive pool after the threshold level is attained. The threshold level may involve a predetermined ratio of the main progressive pool to the reserve progressive pool.

These and other features of the present invention will be presented in more detail in the following detailed description of the invention and the associated figures.

BRIEF DESCRIPTION OF THE DRAWINGS

The invention may best be understood by reference to the following description taken in conjunction with the accompanying drawings, which are illustrative of specific implementations of the present invention.

DESCRIPTION OF THE PREFERRED EMBODIMENTS

Figure 1:
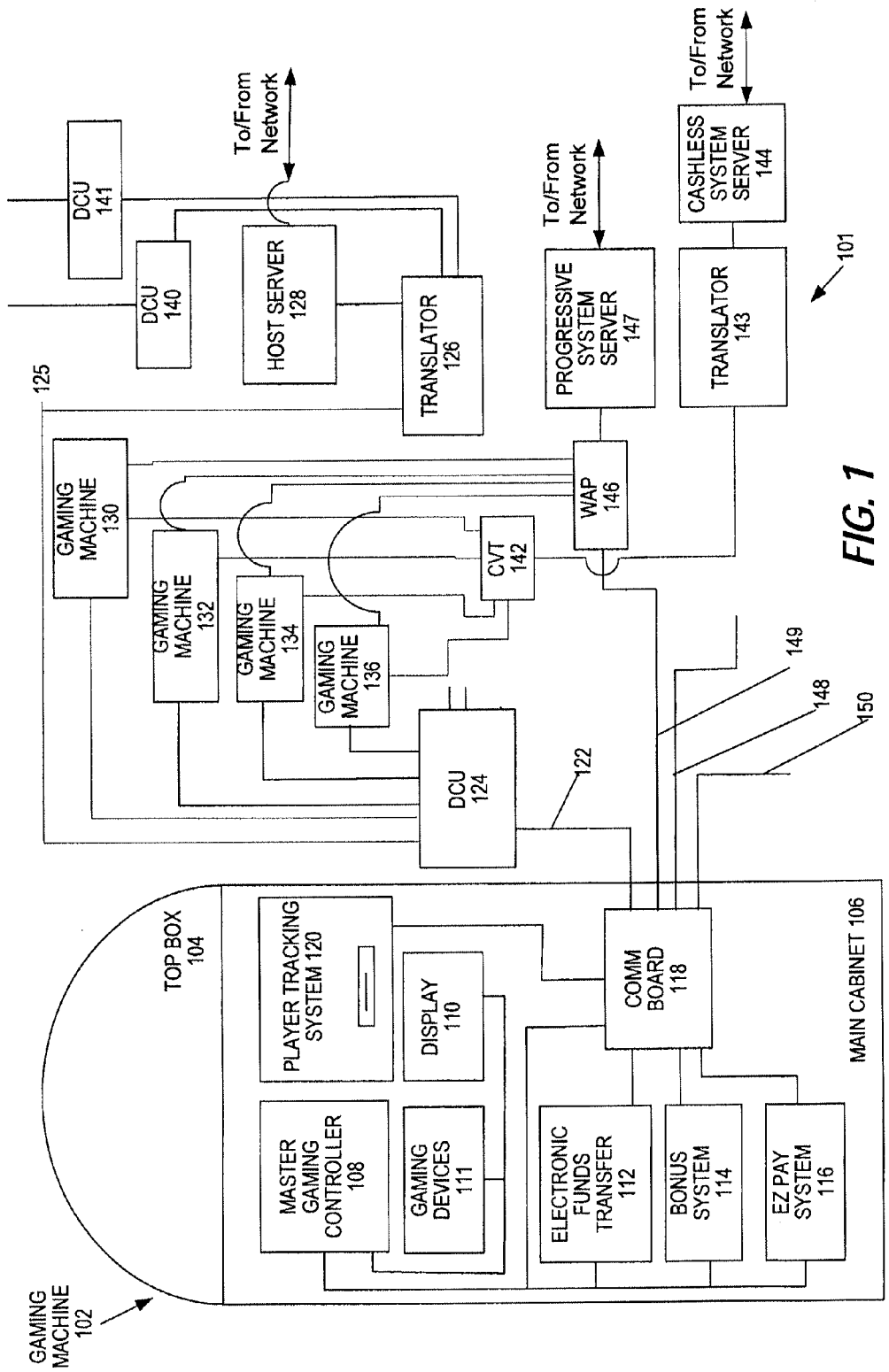
FIG. 1 is a block diagram depicting a network of gaming machines and other devices within a gaming establishment.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

The present invention provides novel method and devices for implementing progressive systems on networked gaming machines and associated network devices. Some preferred implementations of the invention allow a target progressive pool size to be selected and apply payouts such that the actual progressive pool size is managed. The actual progressive pool size may be managed by controlling contributions to the progressive pool and/or by controlling payouts of the progressive pool.

For example, payouts of the progressive pool may be controlled such that the actual progressive pool size is not likely to exceed greatly the target progressive pool size. Some such implementations control the actual progressive pool size by applying a function to control percentages of the current progressive pool size payable to players of a wagering game on the networked gaming machines. The function may be a function of a current progressive pool size, target progressive pool size and bet size. The function may cause relatively higher percentages of the current progressive pool size to be payable to players when the current progressive pool amount is greater than a target progressive pool size and relatively lower percentages of the current progressive pool size to be payable to players when the current progressive pool size is less than or equal to a target progressive pool size.

The present invention provides progressive systems implemented on gaming machines and associated network devices on a network. In some implementations, percentages of wagers from gaming machines at a single gaming establishment will contribute to a wide area progressive pool. In alternative implementations, multiple gaming establishments may elect to participate in a wide area progressive system. If so, percentages of wagers from gaming machines at all participating gaming establishments will contribute to a wide area progressive pool. In order to provide some contexts for implementation of the invention, some exemplary gaming machines, gaming networks and related network devices will now be described with reference to FIGS. 1 and 2.

FIG. 1 is a simplified block diagram depicting, inter alia, gaming machines within gaming establishment 101. The gaming machines are connected with a dedicated communication network via a host server and a data collection unit (DCU) according to one embodiment of the invention. According to some embodiments of the invention, the DCU is an enhanced DCU as described in U.S. patent application Ser. No. 10/187,059, entitled "Redundant Gaming Network Mediation," which is hereby incorporated by reference in its entirety.

In FIG. 1, gaming machine 102, and the other gaming machines 130, 132, 134, and 136, include a main cabinet 106 and a top box 104. The main cabinet 106 houses the main gaming elements and can also house peripheral systems, such as those that utilize dedicated gaming networks. The top box 104 may also be used to house these peripheral systems.

The master gaming controller 108 controls the game play on the gaming machine 102 and receives or sends data to various input/output devices 111 on the gaming machine 102. The master gaming controller 108 may also communicate with a display 110.

A particular gaming entity may desire to provide network gaming services that provide some operational advantage.

Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 108 may also communicate with EFT system 112, bonus system 114, EZPay™ system 116 (a proprietary cashless ticketing system of the present assignee), and player tracking system 120. The systems of the gaming machine 102 communicate the data onto the network 122 via a communication board 118.

In some implementations, the dedicated communication network is not accessible to the public. Due to the sensitive nature of much of the information on the dedicated networks, for example, electronic fund transfers and player tracking data, usually the manufacturer of a host system, such as a player tracking system, or group of host systems, employs a particular networking language having proprietary protocols. For instance, 10-20 different companies produce player tracking host systems where each host system may use different protocols. These proprietary protocols are usually considered highly confidential and not released publicly. Thus, whenever a new host system is introduced for use with a gaming machine, rather than trying to interpret all the different protocols utilized by different manufacturers, the new host system is typically designed as a separate network. Consequently, as more host systems are introduced, the independent network structures continue to build up in the casino. Examples of protocol mediation to address these issues may be found, for example, in U.S. Pat. No. 6,682,423, "Open Architecture Communications in a Gaming Network," which is hereby incorporated by reference in its entirety.

Further, in the gaming industry, many different manufacturers make gaming machines. The communication protocols on the gaming machine are typically hard-coded into the gaming machine software, and each gaming machine manufacturer may utilize a different proprietary communication protocol. A gaming machine manufacturer may also produce host systems, in which case their gaming machines are compatible with their own host systems. However, in a heterogeneous gaming environment, such as a casino, gaming machines from many different manufacturers, each with their own communication protocol, may be connected to host systems from many different manufacturers, each with their own communication protocol. Therefore, communication compatibility issues regarding the protocols used by the gaming machines in the system and protocols used by the host systems must be considered.

In the present illustration, the gaming machines, 102, 130, 132, 134, and 136 are connected to a gaming network 122. In general, the DCU 124 functions as an intermediary between the different gaming machines on the network 122 and the host server 128. In general, the DCU 124 receives data transmitted from the gaming machines and sends the data to the host server 128 over a transmission path 126. In some instances, when the hardware interface used by the gaming machine is not compatible with the host server 128, a translator 125 may be used to convert serial data from the DCU 124 to a format accepted by the host server 128. The translator may provide this conversion service to a plurality of DCUs, such as 124, 140 and 141.

Further, in some dedicated gaming networks, the DCU 124 can receive data transmitted from the host server 128 for communication to the gaming machines on the gaming network. The received data may be communicated synchronously to the gaming machines on the gaming network. Within a gaming establishment, the gaming machines 102, 130, 132, 134 and 136 are located on the gaming floor for player access while the host server 128 is usually located in another part of gaming establishment 101 (e.g. the backroom), or at another location.

In a gaming network, gaming machines, such as 102, 130, 132, 134 and 136, may be connected through multiple communication paths to a number of gaming devices that provide gaming services. For example, gaming machine 102 is connected to four communication paths, 122, 148, 149 and 150. As described above, communication path 122 allows the gaming machine 102 to send information to host server 128.

Via communication path 148, the gaming machine 102 is connected to a clerk validation terminal 142. The clerk validation terminal 142 is connected to a translator 143 and a cashless system server 144 that are used to provide cashless gaming services to the gaming machine 102. In this implementation, other gaming machines in gaming establishment 101, including gaming machines 130, 132, 134 and 136, are also connected to clerk validation terminal 142 and also receive cashless system services. Moreover, in this implementation, cashless system server 144 is in communication with a network, which may include connectivity to gaming establishments other than gaming establishment 101. Accordingly, cashless system server 144 may provide cashless system services to gaming machines located in other gaming establishments.

Via communication path 149, the gaming machine 102 is connected to a wide area progressive (WAP) device 146. The WAP is connected to a progressive system server 147 that may be used to provide progressive gaming services to gaming machines in and, in this example, to gaming establishments other than gaming establishment 101. The progressive game services enabled by the progressive game network increase the game playing capabilities of a particular gaming machine by enabling a larger jackpot than would be possible if the gaming machine was operating in a "stand alone" mode. Playing a game on a participating gaming machine gives a player a chance to win the progressive jackpot. The potential size of the jackpot increases as the number of gaming machines connected in the progressive network is increased. The size of the jackpot depends, in part, on the odds of hitting the jackpot. Having a large number of machines increase the rate at which the jackpot increases, which adds much excitement, and increases the frequency with which the jackpot is paid, again adding excitement. If the odds are 100,000,000:1 and the progressive rate is 1% of $1.00 wagered, the average jackpot will be $1,000,000 if one machine is being played or if 1000 machines are being played. But in the case of 1 machine being played the jackpot may not hit in our lifetime (100,000,000 games on average). In the case of 1000 machine being played the jackpot will hit every 100,000 games, on average, on any given machine.

Gaming machines 130, 132, 134 and 136 are connected to WAP device 146 and progressive system server 147. Other gaming machines may also be connected to WAP device 146 and/or progressive system server 147, as will be described below with reference to FIG. 2. Via communication path 150, the gaming machine 102 may be connected with additional gaming devices (not shown) that provide other gaming services.

In some embodiments of the present invention, gaming machines and other devices in the gaming establishment depicted in FIG. 1 are connected to a central system and/or other gaming establishments via one or more networks, which may be public or private networks. In this example, host server 128, progressive system server 147 and cashless system server are connected to an outside network. In other embodiments, a bingo server, a switch, or another type of network device may be part of an interface with an outside network. In some embodiments, a single network device links a gaming establishment with another gaming establishment and/or a central system. Such a network device will sometimes be referred to herein as a "site controller."

Gaming in the United States is divided into Class I, Class II and Class III games. Class I gaming includes social games played for minimal prizes and traditional ceremonial games. Class II gaming includes bingo and bingo-like games, such as pulltab games. Bingo includes games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Class II gaming may also include pulltab games if played in the same location as bingo games, lotto, punch boards, tip jars, instant bingo, and other games similar to bingo. Class III gaming includes any game that is not a Class I or Class II game, such as games of chance typically offered in non-Indian, state-regulated casinos.

The progressive systems of the present invention may be implemented in connection with Class II or Class III game play. U.S. patent application Ser. No. 10/995,636, entitled "Class II/Class III Hybrid Gaming Machine, Systems and Methods," describes relevant methods and devices and is hereby incorporated by reference in its entirety.

Various methods may be used to transmit game data according to the present invention. For example, these game data may indicate game displays, intermediate steps or results for central determination games, e.g. Class H games, such as what bingo card will be used by a particular gaming machine. In some implementations, game data for central determination games are generated using one or more RNG (random number generating) seeds, each of which will provide a known outcome. U.S. Pat. No. 6,533,664, entitled "Gaming System with Individualized Centrally Generated Random Number Generator Seeds," describes the use of RNG seeds and is hereby incorporated by reference for all purposes. Each of the RNG seeds has been pre-calculated to produce a predetermined outcome when processed by a pre-programmed "deterministic RNG," The RNG seeds are advantageous for security purposes and other reasons.

Figure 2:
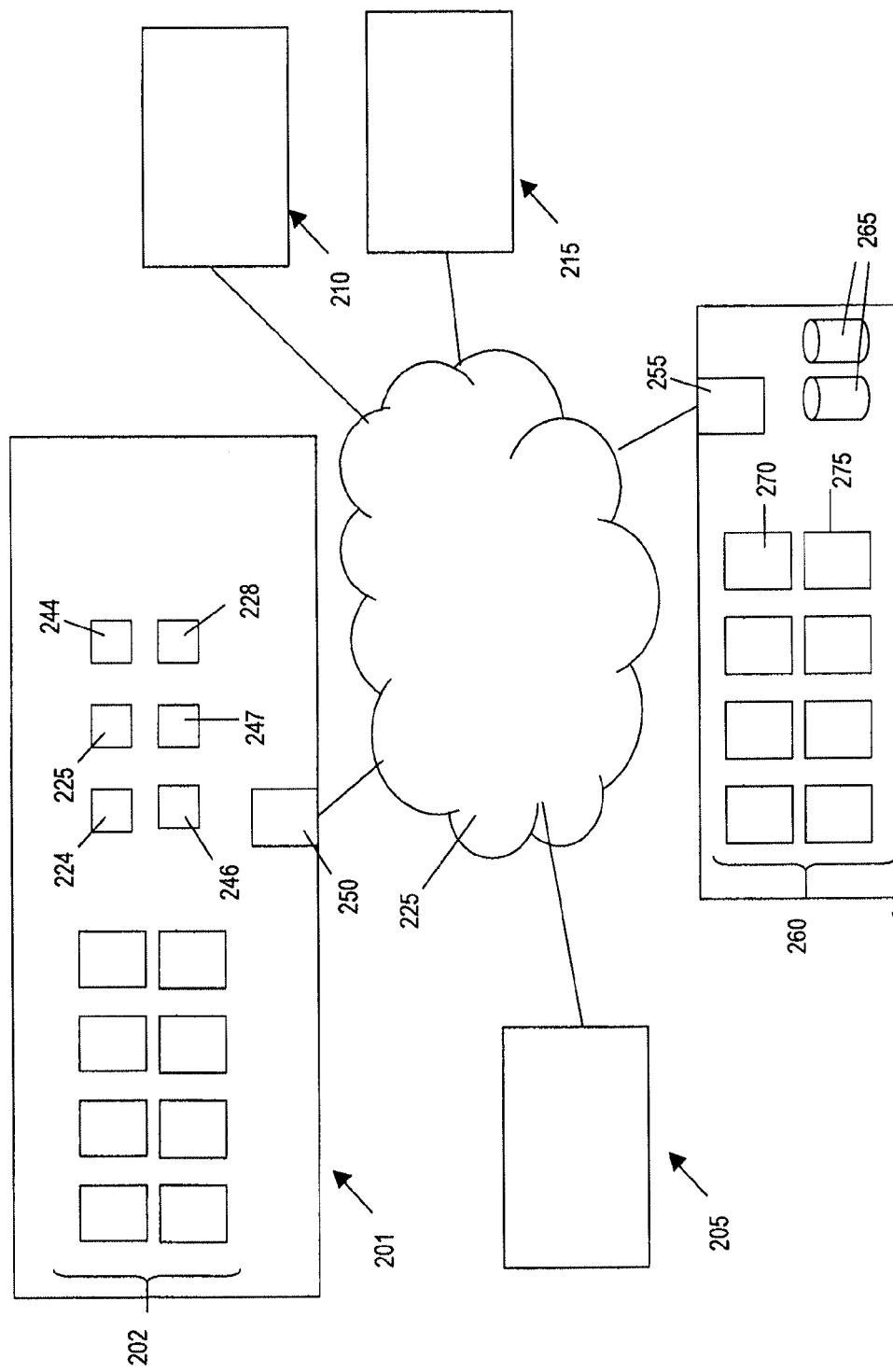
FIG. 2 is a network diagram depicting several gaming establishments configured for communication with a central system via a network that may be used to implement various embodiments of the present invention.

FIG. 2 is a simplified network diagram that illustrates a plurality of gaming establishments connected to a central system. In this example, gaming establishments 201, 205, 210 and 215 are connected to central system 220 via network 225. However, those of skill in the art will realize that more or fewer gaming establishments may be in communication with central system 220. Moreover, although central system 220 is depicted as having a single location, in alternate embodiments of the invention the devices that constitute central system 220 are in two or more locations.

In this example, network 225 is the Internet. However, it will be understood by those of skill in the art that network 225 could be any one of various other types of networks, such as the PSTN, a satellite network, a wireless network, a metro optical transport, etc. Accordingly, a variety of protocols may be used for communication on network 225, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM"), an optical technology used to increase bandwidth over existing fiber optic backbones).

To transfer data in a secure manner, data transmitted over network 225 may be encrypted. In one embodiment of the present invention, an asymmetric encryption scheme incorporating a public-private encryption key pair may be used. Information encrypted with the private encryption key may be decrypted only using the corresponding public encryption key of the public-private encryption key pair and information encrypted with the public encryption key may be decrypted only using the private encryption key of the public-private encryption key pair. Thus, an entity with a private encryption key of public-private encryption key pair may give its public encryption key to many other entities. The public key may be made available (via an Internet server, e-mail, or some other means) to whoever needs or wants it. The private key, on the other hand, is kept secret. Only the owner of the key pair is allowed to possess the private key. The other entities may use the public encryption key to encrypt data. However, as long as the private encryption key remains private, only the entity with the private encryption key can decrypt information encrypted with the public encryption key.

In general, public-key encryption algorithms are very slow and it is impractical to use them to encrypt large amounts of data. In practice, symmetric algorithms are used for encryption/decryption of large amounts of data, while the public-key algorithms are used merely to encrypt the symmetric keys. Similarly, it is not usually practical to use public-key signature algorithms to sign large messages. Instead, a hash may be made of the message and the hash value may be signed. Methods of asymmetric and symmetric keys that may be used to transfer encrypted data in the present invention are described co-pending U.S. patent application Ser. No. 09/732,650, filed Dec. 7, 2000 by Nguyen et al. and entitled, "Secured Virtual Network in a Gaming Environment," which is incorporated herein in its entirety and for all purposes.

A private key of a public-private signature key pair may also be used to sign a message. The signature may be used for authenticating the message. When the private signature key is used to sign a message, then the public signature key must be used to validate the signature. The Digital Signature Standard (DSS) authorized by the U.S. government uses a private signature key, a public encryption key and a secure hash algorithm for generating and authenticating electronic signatures. For example, to send someone a digitally signed message, the message is signed with a private signature key, and the receiver of the message may verify the signature by using the public signature key corresponding to the private signature key. Prior to beginning a secure data transfer, a site controller and central system 220 may have exchanged public encryption keys or public signature keys and other security information that may be used to establish the identity of the sender of a message to central system 220 and to identify messages sent from central system 220. Details of exchanging encryption keys in a secure manner that may be applied to the present invention are described in U.S. patent application Ser. No. 09/993,163, by Rowe et al., filed Nov. 16, 2001 and entitled "A Cashless Transaction Clearinghouse," which is incorporated herein by reference in its entirety and for all purposes.

Gaming establishment 201 is a casino in this example. Gaming establishments 205, 210 and 215 could be any type of gaming establishments that are configured to participate in progressive jackpots, such as casinos, Internet casinos, etc. Gaming establishments 205, 210 and 215 may have the same owner or different owners.

Gaming establishment 201 includes many of the features of gaming establishment 101, including gaming machines 202, DCU 224, translator 225, host server 228, cashless system server 244, WAP device 246 and progressive system server 247. Depending on the embodiment, there may be a single DCU 224 or multiple DCUs. Similarly, there may be one or more translators 225, according to the details of the implementation. However, the methods of the present invention may be performed by other network devices using other physical or logical networks than are illustrated or described herein.

In the embodiment shown in FIG. 2, each gaming establishment includes a network device that acts as a site controller for interacting with central system 220 to provide services, including progressive services. The site controller may also be configured to provide other services, such as bonusing services. In one such implementation, e.g., progressive system server 247 is configured to act as a site controller for providing both bonusing services and progressive jackpot services. As will be discussed in more detail below, many of the functions involved in providing these services can be provided by a site controller, can be performed by a central system or can be distributed among other local and centralized network devices.

Gateway 250 is a network device with network address translation ("NAT") and firewall capabilities that can support multiple devices of gaming establishment 201 with a single external IP address. Gateway 255 provides NAT and firewall capabilities for central system 220. Internet service providers ("ISPs," which are not shown in FIG. 2A) provide access to network 225 for gaming establishments 201, 205, 210 and 215, and central system 220.

In this example, central system 220 also includes multiple network devices 260 and storage devices 265. The number of network and storage devices shown is purely exemplary. Here, central bonusing server 270 controls a bonusing system for all participating gaming devices and gaming establishments. Similarly, central progressive server 275 controls a progressive jackpot system for all participating gaming devices and gaming establishments. In some implementations, the same network device is used to provide both progressive jackpot and bonusing services. The provision of some such services is described in applications and patents that have been incorporated by reference; other progressive services will be described in more detail below.

Central system 220 may provide additional services, including but not limited to cashless services, loyalty program services, auditing services, entertainment content services, communication services, gaming software services, prize services, etc. In some implementations, individual network devices may provide some or all of such services, whereas in other embodiments separate network devices, storage devices, etc., may be dedicated to providing such services.

Cashless services may include services and information related to, e.g., electronic fund transfers. Loyalty program services may include services and information related to the accumulation of player tracking points and the validation of player tracking points for services and prizes. Auditing/accounting services may include services and information relating to player identity, tracking the performance of different gaming activities, etc. However, in some implementations of the present invention, bonusing services and/or progressive jackpot services are de-coupled from player tracking. This feature is advantageous because gaming establishments regard player tracking information as confidential and proprietary. Providing, e.g., bonusing services separately from player tracking services removes impediments to implementing bonusing services to multiple gaming establishments. Therefore, some methods of the present invention facilitate the accumulation of larger bonuses.

Entertainment content services may include information and services related to streaming video feeds and audio feeds to a client device of, for example, sporting events. Communications services may include information and services related to peer-to-peer communications between various devices in central system 220 and outside of central system 220, such as text messaging, voice communications, video feeds, e-mail, paging and locator services.

Gaming software services may include devices configured for downloading software to gaming devices. For instance, a game server may provide gaming software and gaming licenses used to play different games of chance on gaming devices. Further, the game server may be used to provide software upgrades and "bug" fixes for the gaming software. U.S. Pat. No. 6,645,077, which is hereby incorporated by reference, provides examples of such software services.

The prize services may include providing combinations of cash and non-cash prizes for awards on the client devices 110 and methods for redeeming the non-cash prizes. Progressive game services may be related to providing progressive jackpots for games of chance. Details of non-cash prize methods and game services that may be used with the present invention are described in co-pending U.S. application Ser. No. 09/515,717, filed on Feb. 29, 200, by Nguyen, and entitled "Name Your Prize Game Playing Methodology," which is incorporated herein in its entirety and for all purposes.

Figure 3A:
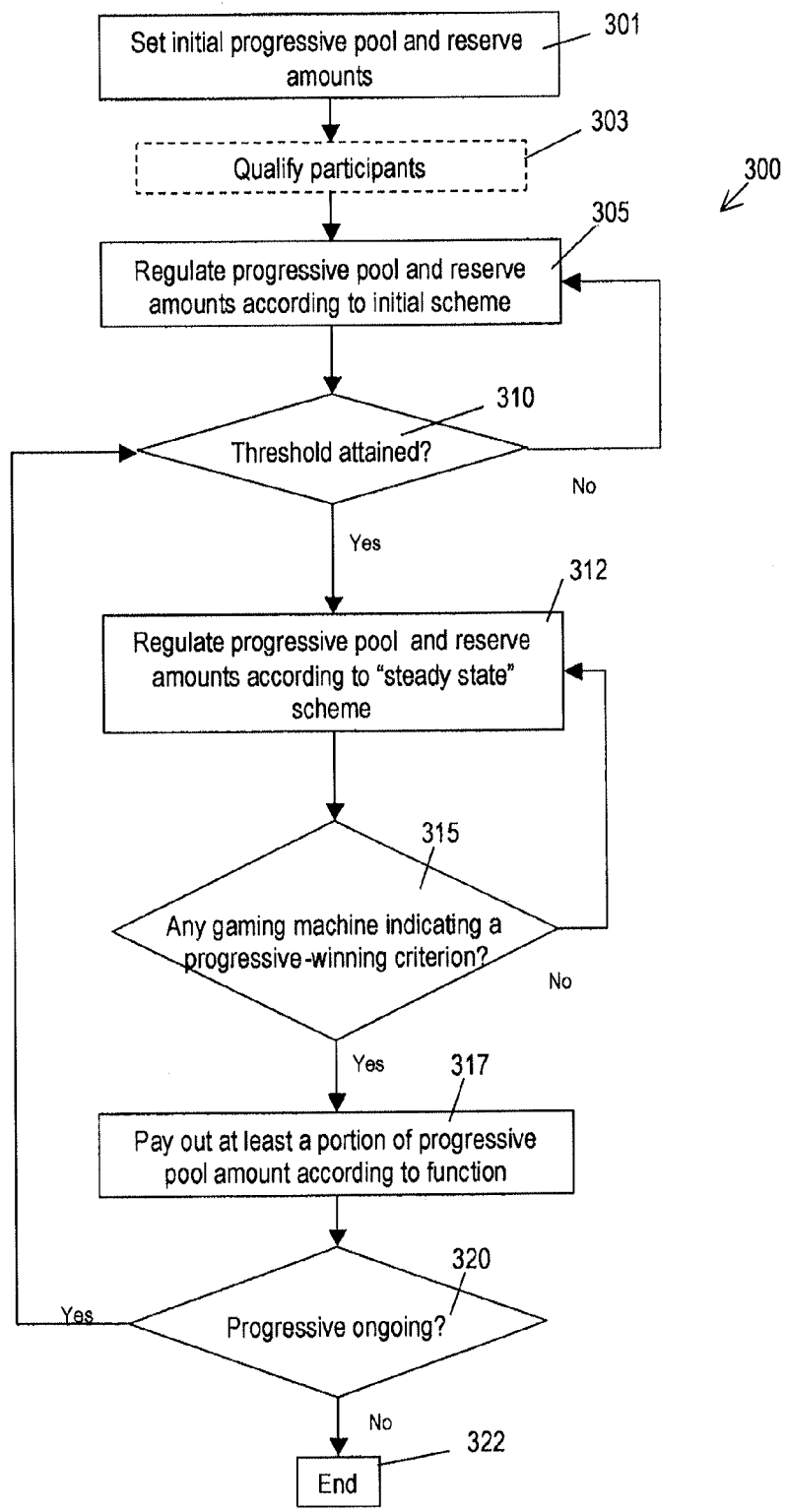
FIG. 3A is a flow chart that provides an overview of some methods of the present invention.

Some implementations of the present invention will now be described with reference to FIG. 3A. Those of skill in the art will appreciate that the steps of method 300 need not be performed (and in some implementations are not performed) in the order shown. Moreover, some implementations of method 300 may include more or fewer steps than those shown in FIG. 3A. Method 300 may be performed in the context of a multi-gaming machine network that may be configured in any convenient fashion, including but not limited to the types of networks described above. Many of the steps of method 300 (particularly the regulating and determining steps) may be performed, at least in part, by a network device such as a progressive server.

In step 301, initial main progressive pool and reserve progressive pool amounts are established. Step 301 may be performed, e.g., by a progressive server according to instructions from software, from a network administrator, etc. Although a progressive pool could, for example, start from zero and increase only as contributions are made to the progressive pool, in preferred embodiments a larger initial progressive pool size is established. Having a substantial progressive pool size from the beginning adds to player excitement and interest. In this example, an initial progressive pool size of $50,000 is established in step 301.

A reserve progressive pool amount is preferably established at the same time the initial main progressive pool is established. The reserve amount may be used to cover, at least in part, the costs of paying out the progressive prizes. A reserve is particularly useful when, as in this example, the progressive pool amount is initially established at a non-zero amount. In this example, in step 301 a reserve amount of −$50,000 is established, using a "balance sheet" accounting method. In other words, because a $50,000 initial progressive has been established, the potential exposure is $50,000, but no money has yet been allocated from wagers at participating gaming machines.

Some implementations of the invention include optional step 303, wherein participants, sites and/or types of gaming devices are qualified for, or eliminated from, participation in a progressive system based on various criteria. These criteria may include, but are not limited to, gaming history (e.g., as indicated by a player tracking card or a player tracking account), contribution level, games available, date range, location, device manufacturer and denominations available. In some implementations, the qualification or elimination process is performed at a site (e.g., by a site controller) according to criteria obtained from a central system. In alternative implementations, the qualification or elimination process is performed by the central system. Some advantageous qualification methods are described in U.S. application Ser. No. 10/923,333, entitled "Wide Area Bonusing Systems," which is hereby incorporated by reference in its entirety.

However, in alternative implementations of the invention, there is no qualification step 303. Instead, players merely initiate play on a gaming machine that is configured for participation in a progressive system (e.g., by making a payment and placing a bet).

In step 305, the main progressive pool amount and the reserve progressive pool amount are both regulated according to an initial algorithm or set of algorithms. Although a main thrust of the present invention involves the payouts of progressive prizes, such payouts decrease the progressive pool amount and are logically related to the desired reserve amount. Accordingly, both the progressive pool amount and the reserve amount may be augmented and depleted according to various aspects of the invention.

In some implementations, step 305 will involve increasing the reserve progressive pool amount at a relatively higher initial rate, e.g., when the reserve progressive pool amount is a negative number. For example, if a percentage of each wager on a gaming machine is being contributed to the progressive system (sometimes referred to herein as a "contribution" or "total contribution"), 75% of the contribution may initially be allocated to increasing the reserve amount and 25% of the contribution may initially be allocated to increasing the main progressive pool amount. Although the contribution may be any reasonable percentage, in some implementations the contribution is 1% or less and in other implementations the contribution is more than 1%.

However, the contributions may be allocated to the reserve progressive pool amount and the main progressive pool amount according to any convenient method. For example, 90% of the contribution may initially be allocated to increasing the reserve amount and 10% of the contribution may initially be allocated to increasing the main progressive pool amount. Alternatively, the proportions may change smoothly or stepwise during an initial or a subsequent period, e.g., with a greater proportion being diverted to the reserve in the earlier portion(s) of the initial period and a smaller proportion being diverted to the reserve in later portion(s) of the initial period.

Some implementations of the invention provide methods wherein a relatively higher proportion of the total contribution is allocated to the main progressive pool until certain threshold conditions are achieved, then allocating a relatively lower proportion of the total contribution to the main progressive pool until some other condition is achieved. Some such implementations may advantageously be applied when a reserve progressive pool amount is greater than zero.

In one such implementation of the invention, allocations to a main progressive pool and a reserve progressive pool are controlled according to the following formula:

$$MPR=((PSR*R)/M)*(PSR/(PSR+1))*TR \quad \text{Equation (1)}$$

Here, MPR stands for "main progressive rate," the proportional contribution to the main progressive pool. The current size of the main progressive pool is M and the current size of the reserve progressive pool is R. The desired ratio of the main progressive pool to the reserve progressive pool is PSR, the pool size ratio. TR is the "total rate" or total contribution.

For example, suppose the total contribution is 2%. At this time, the main and reserve pool sizes are $100,000 and $60,000 respectively. In this example, we want the main progressive pool to be twice the size of the reserve progressive pool. Within the framework of Equation (1), this means that TR=2%, M=100,000, R=60,000, and PSR=2. Accordingly, MPR=((2*60000)/100000)*⅔*2=1.6%. The proportional contribution to the reserve progressive pool would be 0.4%.

Note that the first term of Equation (1), ((PSR*R)/M), approaches 1 as the ratio of the main progressive pool to the reserve progressive pool approaches the desired ratio. In this example, when the main progressive pool is twice the size of the reserve progressive pool, this term equals one. At this point, a "steady state" of proportional contributions to the main and reserve progressive pools is attained. Then, MPR equals ⅔ of the 2% total contribution, so MPR equals 1.33%. Accordingly, ⅓ of the 2% total contribution is allocated to the reserve progressive pool. Until some condition changes (e.g., a progressive payout), the ratio of the main progressive pool to the reserve progressive pool remains two to one and stability is maintained. One of skill in the art will appreciate that the foregoing discussion applies equally to establishing a ratio of the reserve progressive pool to the main progressive pool.

In some implementations of the invention, a relatively higher portion of the total contribution is applied to the reserve progressive pool amount when the reserve progressive pool amount is zero or negative. When the reserve progressive pool amount is a positive number, a relatively lower portion of the total contribution is applied to the reserve progressive pool amount, e.g., as described above with reference to Equation (1). Accordingly, there can be multiple threshold criteria or events within the method, each of which will change the relative allocation of the total contribution in a predetermined way.

According to some implementations of the invention, payouts of progressive prizes will also be regulated differently when the main progressive pool amount and/or the reserve progressive pool amount is less than a desired threshold than when the main progressive pool amount and/or the reserve progressive pool amount is greater than or equal to the desired threshold. For example, a function may be applied such that payouts of progressive prizes are relatively smaller when the main progressive pool amount and/or the reserve progressive pool amount is less than a desired amount. Some such exemplary functions will be described below with reference to FIG. 3E.

In step 310, it is determined whether a predetermined criterion has reached a desired or threshold level. This "threshold level" may be, for example, an absolute number (e.g., when the reserve progressive pool amount becomes a positive number, when the main progressive pool amount reaches a particular value, etc.), a desired ratio of the reserve amount to the main amount, or some other criterion. In some such implementations, a reserve progressive pool threshold level is measured with reference to the main progressive pool size. For example, the reserve progressive pool threshold level may be some predetermined constant C times the main progressive pool size, where C may be less than, greater than or equal to 1. For example, C may be 0.5 and the reserve progressive pool threshold level is set to be half of the main progressive pool size. Alternatively, C may be 1 and the reserve progressive pool threshold level is set to be equal to the main progressive pool size. However, in other implementations the threshold level may be defined in other ways, e.g., with reference to expected payouts, etc.

In this example, C is equal to one. Therefore, the desired reserve progressive pool amount is equal to the main progressive pool size. Moreover, 75% of the contribution is initially allocated to increasing the reserve progressive pool amount and 25% of the contribution is initially allocated to increasing the main progressive pool amount. Therefore, assuming that no payouts of the main progressive prize occur during this initial period, the reserve progressive pool amount will be equal to the main progressive pool size after $200,000 in contributions has been received from participating gaming machines.

At that stage, it will be determined in step 310 that the reserve has attained the threshold level. Accordingly, in this exemplary implementation, the main progressive pool and reserve progressive pool amounts will be regulated according to a second set of conditions, algorithms, or the like. (Step 312.) These conditions will sometimes be referred to herein as "steady state" or "secondary" conditions, in order to distinguish them from the initial conditions. According to some implementations (e.g., as described above with reference to Equation (1)), a single formula may define both the initial and the steady state conditions. Moreover, some implementations provide more than two schemes/sets of conditions. For example, a first set of conditions may be applied when the reserve progressive pool amount is less than or equal to zero, then a second set of conditions may be applied until another threshold is attained (e.g., a desired ratio of the main progressive pool amount to the reserve progressive pool amount) and then a third set of conditions will apply until another condition occurs and/or another threshold is reached.

In some preferred implementations, the steady state conditions will tend to maintain a desired relationship between the reserve amount and the main progressive pool amount. According to one such implementation of step 312, contributions will be apportioned in order to maintain a desired relationship between the reserve amount and the main progressive pool amount. In the current example, the reserve amount equals the main progressive pool amount. Therefore, step 312 involves changing the apportionment of contributions to a 50/50 apportionment between the reserve and the progressive pool.

In preferred implementations of the invention, implementing the "steady state" conditions in step 312 will also include applying methods of the present invention for controlling the progressive pool amount so that it does not greatly exceed a target progressive pool amount. Some such methods are implemented by applying an algorithm, also referred to herein as a function. However, as used herein, the "function" need not be a function in the strict mathematical sense of having only one f(x) for a given x.

According to some implementations, the function is a function of a current progressive pool size, target progressive pool size and/or bet size. The function may cause relatively higher percentages of the current progressive pool size to be payable to players when the current progressive pool amount is greater than a target progressive pool size and relatively lower percentages of the current progressive pool size to be payable to players when the current progressive pool size is less than or equal to a target progressive pool size. Some such exemplary functions will be described below with reference to FIGS. 3B through 3D.

In step 315, it is determined whether any participating gaming machine is eligible to win a progressive prize. For example, if the underlying game is a bingo game, the first player whose gaming machine indicates "hits" on all areas of a progressive pattern of a bingo card may be eligible for a progressive prize. In some implementations, a player is eligible for a progressive prize only if the progressive pattern is completed before there are any other hits on a player's bingo card. Other games, e.g., Class III games such as slot games, poker games, etc., have various criteria for establishing a progressive win.

If no player wins a progressive prize, the progressive pool continues to grow according to the "steady state" process of step 312. However, if player is eligible for a progressive prize, at least a portion of the main progressive pool is paid out in step 317. As described in more detail below, the progressive payout may be proportional to the player's bet. If the progressive is still ongoing, the process continues to step 310, wherein the reserve level is evaluated. If paying out the progressive prize has caused the reserve to dip below a desired/threshold level, the reserve and progressive amounts are regulated according to the conditions of step 305. If paying out the progressive prize has not caused the reserve to dip below the threshold level, the reserve and progressive amounts are regulated according to the conditions of step 312.

Figure 3B:
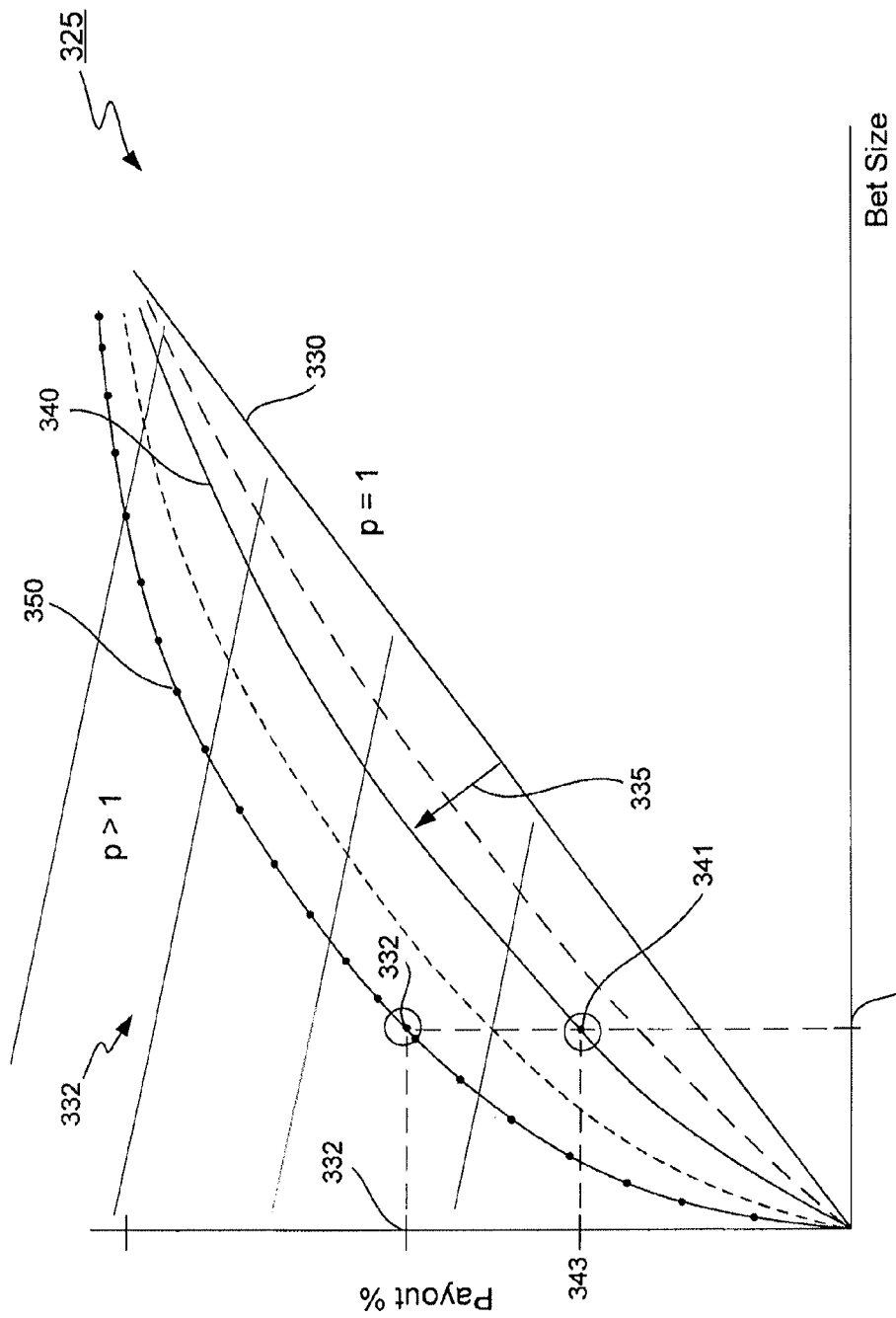
FIG. 3B is a graph that indicates some methods of the present invention.

FIG. 3B illustrates graph 325, which illustrates some general features of functions that may be applied to control payouts of progressive prizes such that the main progressive pool amount tends to stay within the realm of a target progressive pool amount. In graph 325, winning bet sizes are indicated along the horizontal axis and payout percentages of the progressive award are indicated along the vertical axis.

The functions shown in FIG. 3B are power functions of bet size. Some such functions may be expressed in the form of $B^p$, where B is a function of the bet size and p is a function of the current progressive pool amount. In some such functions, p is proportional to the current progressive pool amount divided by the target progressive pool amount. B may be based, at least in part, on a winning bet size divided by a maximum bet size.

When p=1, as shown by curve 330, the progressive payout percentage is linearly proportional to bet size. However, for curves lying in region 332, wherein p>1, the progressive payout percentage is not linearly proportional to bet size. Moreover, it may be seen from FIG. 3B that as p increases (in the direction of arrow 335), the same bet has a higher payout percent. For example, bet 337 corresponds with point 341 of curve 340, which has a corresponding payout percentage 343. However, bet 337 corresponds with point 351 of curve 350, which has a corresponding payout percentage 353. It is evident that payout percentage 353 is a higher percentage than payout percentage 343. Note that in these examples the function $B^p$ is monotonically increasing such that, even though the function is non-linear, regardless of the value of p, a larger bet will win a larger payout percentage.

One important effect of increasing the payout percentages of relatively smaller bets is that relatively larger progressive awards will tend to be made more frequently, because small bets are more commonly placed than large bets. If relatively larger progressive awards are made more often, the progressive pool size will be drawn down more rapidly. Therefore, increasing the payout percentages of relatively smaller bets can decrease the likelihood that the progressive pool size will reach a larger-than-desired size.

Figure 3C:
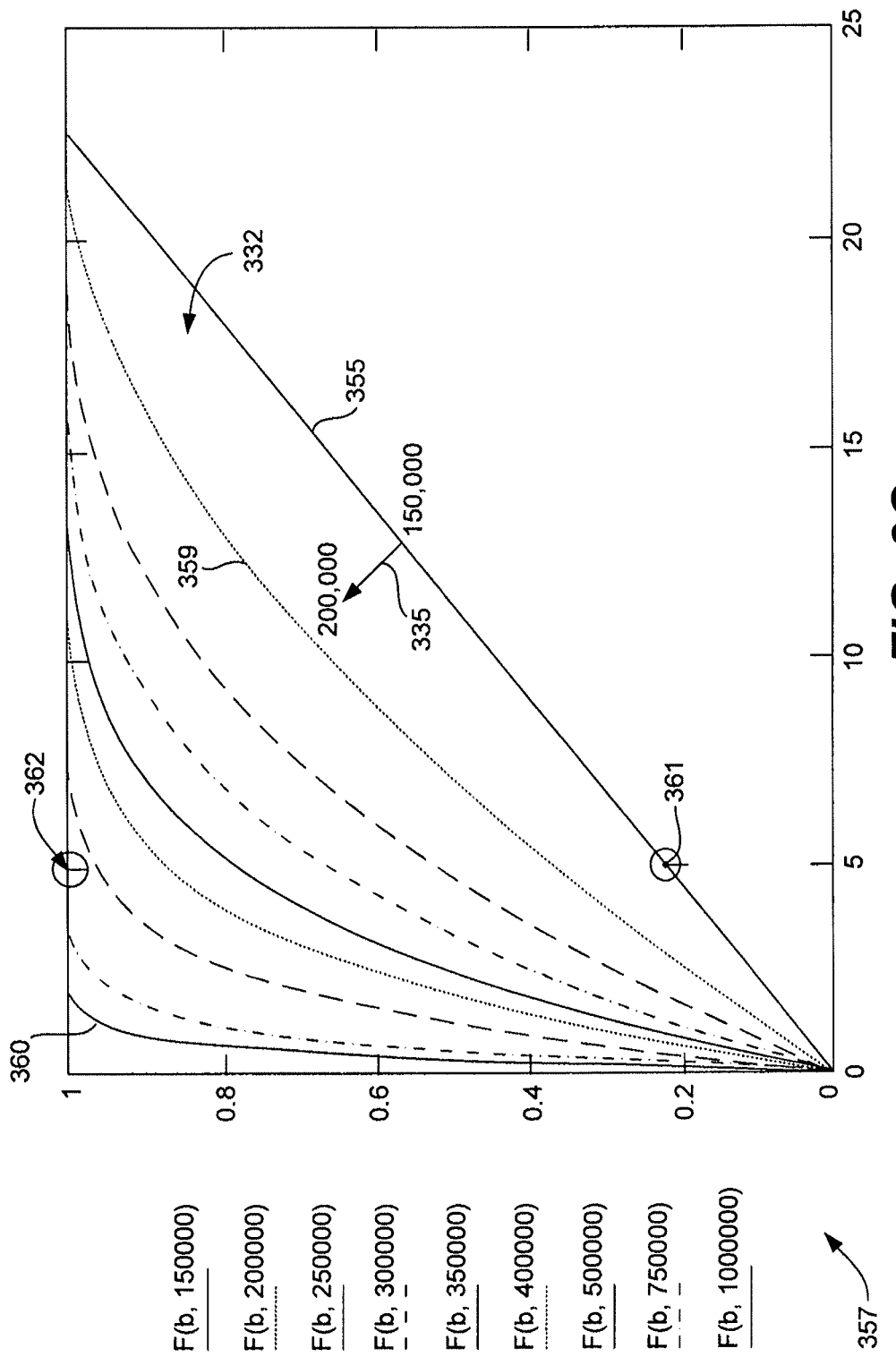
FIG. 3C is a graph that indicates alternative methods of the present invention.

FIG. 3C is a graph indicating a family of curves expressed in the form of $B^p$, where B is a function of the bet size and p is proportional to the current progressive pool amount divided by the target progressive pool amount. As in FIG. 3B, winning bet sizes are indicated along the horizontal axis and payout percentages of the progressive award (which are expressed in decimal form) are indicated along the vertical axis. In this example, the function used to control the main progressive pool size is as follows:

$$F(b,A)=1-(1-b/b_{Max})^{(A/T)^c}$$ Equation (1)

Here, the ratio of the actual to the desired progressive pool amounts is raised to the power of a constant "c" The constant c increases the effect of small differences between actual and desired progressive pool levels. The constant c may vary according to the implementation and may be less than, greater than or equal to one. In one implementation, c=1.414. Note that if c=0, then the function f(b,A) is linear because $(A/T)^0=1$.

In Equation (1), b is the actual bet size, $b_{Max}$ is the maximum bet size, A is the actual (main) progressive pool size and T is a target progressive pool size.

The curves shown in FIG. 3C are specific instances of Equation (1), wherein $b_{Max}$ is $22.5, c=1, T is $150,000 and A ranges from $150,000 to $1,000,000. This may be expressed as follows:

$$F(b,A)=1-(1-b/22.5)^{(A/150000^{\wedge}1)}$$ Equation (2)

Accordingly, curve 355 of FIG. 3C corresponds to the case wherein A equals $150,000 and p equals 1. In region 332, there is a family of curves wherein p is greater than 1. As the actual progressive pool size increases, the curves "belly out" in the direction of arrow 335: for example, curve 359 illustrates the case in which A equals $150,000 and curve 360 illustrates the case in which A equals $1,000,000. Key 357 indicates the line patterns for several members of this family of curves.

It may be seen that as the actual progressive pool size increases from the target size of $150,000, all winning bets (except the maximum bet) have a higher corresponding payout percentage. As the actual progressive pool size becomes larger, even a relatively small winning bet has a high corresponding payout percentage. For example, a $5 winning bet will be awarded slightly more than 20% of the progressive pool amount when the actual progressive pool amount equals the target size of $150,000. However, as the actual progressive pool amount approaches $1,000,000, the payout percentage for a winning $5 bet approaches 100% of the actual progressive pool amount. Because relatively smaller bets (such as the $5 bet) are more common than relatively larger bets (such as the $22.50 maximum bet), increasing the payout percentages of relatively smaller bets decreases the likelihood that the progressive pool size will reach a larger-than-desired size.

It may be seen from the foregoing discussion that implementing a percent payout that is a function of bet size, actual progressive pool size and target progressive pool size can be advantageous because such a function causes payout percentages to increase in response to a growing actual progressive pool size. However, many other functions for regulating an actual progressive pool size are within the scope of the present invention.

Figure 3D:
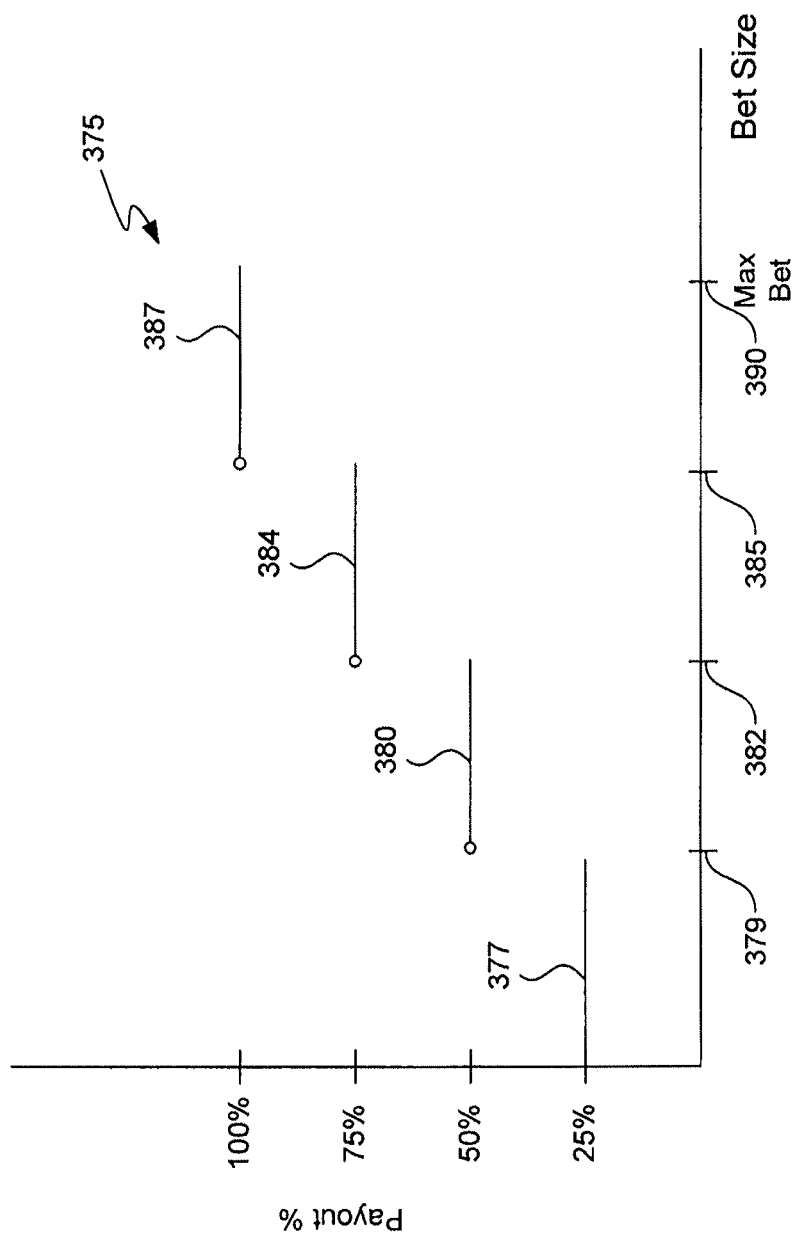
FIG. 3D is a graph that indicates other methods of the present invention.

One such variation is the simple step function of payout percentage and bet size illustrated in FIG. 3D. In step function 375, all bets in region 377 from a minimum bet to a bet 379 will have a payout percentage of 25%. Similarly, all bets in region 380 that are greater than bet 379, up to and including bet 382 will have a payout percentage of 50%; all bets in region 384 that are greater than bet 382, up to and including bet 385 will have a payout percentage of 75%; and all bets in region 387 that are greater than bet 385, up to and including maximum bet 390 will have a payout percentage of 100%. In some implementations, the payout percentages may be adjusted when a progressive pool amount has become larger than desired. For example, the payout percentages may be adjusted by increasing the payouts for relatively smaller bets (e.g., in regions 377, 380, and/or 384). Such an adjustment could be made manually, e.g. by a network administrator, or could be made automatically, e.g., according to software controlling one or more logic devices of a network device such as a progressive server.

Figure 3E:
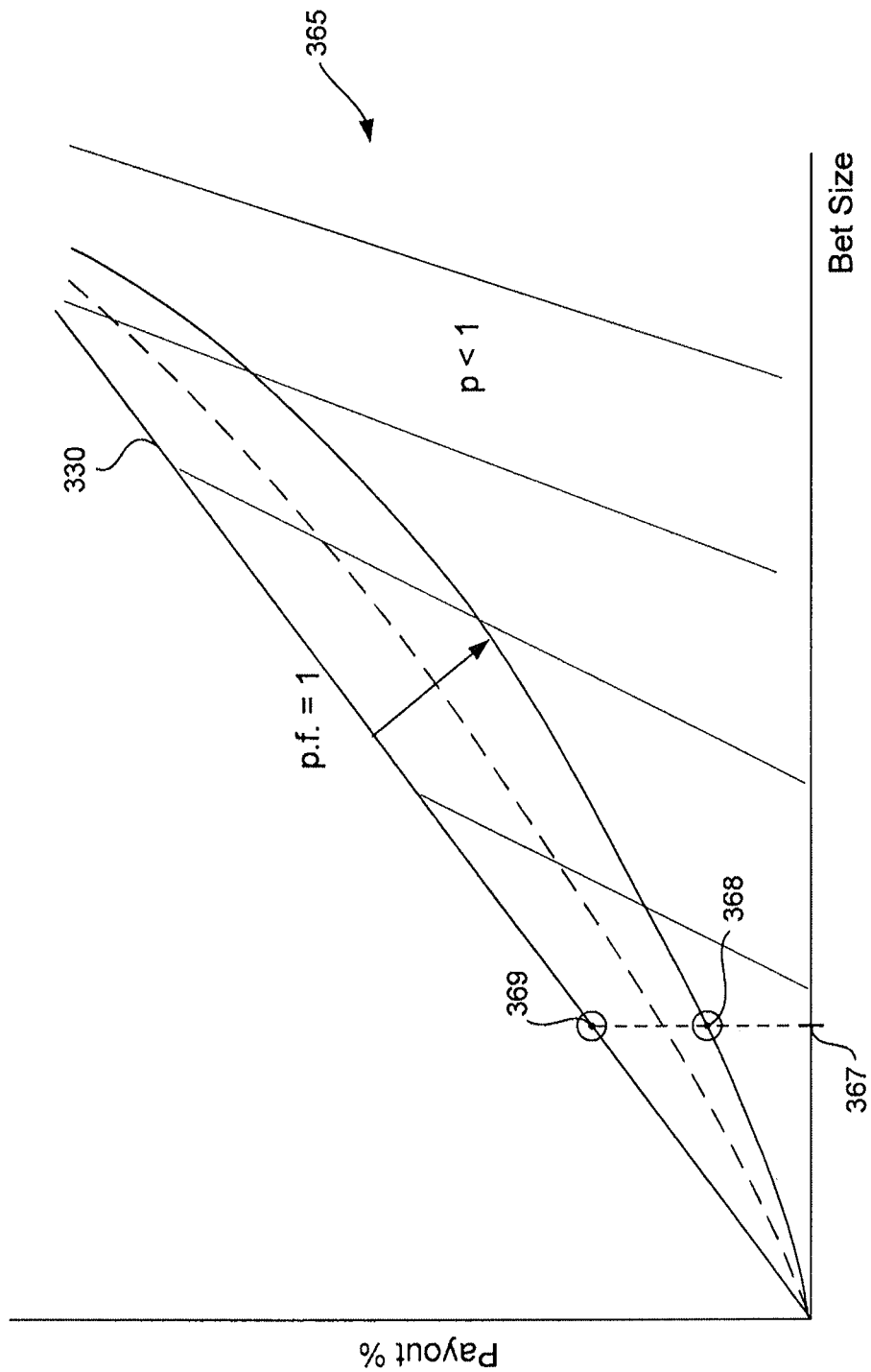
FIG. 3E is a graph that indicates yet other methods of the present invention.

In some instances, it may be desirable to make progressive payouts relatively smaller than would be the case if, e.g., payout percentage is proportional to winning bet size divided by maximum bet size. For example, in some implementations of method 300, step 305 may include not only the step of diverting a relatively higher proportion of contributions to the reserve, but also the step of decreasing the payout percentage for smaller wagers, e.g., as shown in FIG. 3E. Because there tend to be more small wagers than large wagers, this step tends to reduce the odds of a large progressive payout Moreover, some gaming establishment managers may prefer to have relatively larger progressive prizes. Such managers may decide, for example, that the player excitement caused by having large progressive pool amounts leads to extra revenue that offsets the negative consequences of having such large progressive pool amounts. These managers could apply functions to make progressive payouts relatively smaller, thereby deliberately increasing the actual progressive pool size even during "steady state" conditions.

Although such methods can be implemented in numerous ways within the scope of the present invention, one such example will now be described with reference to FIG. 3E. As in some of the foregoing implementations, the functions shown in FIG. 3E are power functions of bet size. Again, some such functions may be expressed in the form of $B^p$, where B is a function of the bet size and p is a function of the current progressive pool amount. In some such functions, p is proportional to the current progressive pool amount divided by the target progressive pool amount. B may be based, at least in part, on a winning bet size divided by a maximum bet size.

As noted above, when p=1 (as shown by curve 330), the progressive payout percentage is linearly proportional to bet size. However, for curves lying in region 365, wherein p<1, the progressive payout percentage is not linearly proportional to bet size. Moreover, it may be seen from FIG. 3E that as p decreases (in the direction of arrow 366), the same bet has a lower payout percent. Here, bet 367 corresponds with point 369 of curve 330 and with point 368 of curve 370.

Point 369 corresponds with a payout percentage which is approximately twice the percentage corresponding with point 368.

Figure 4:
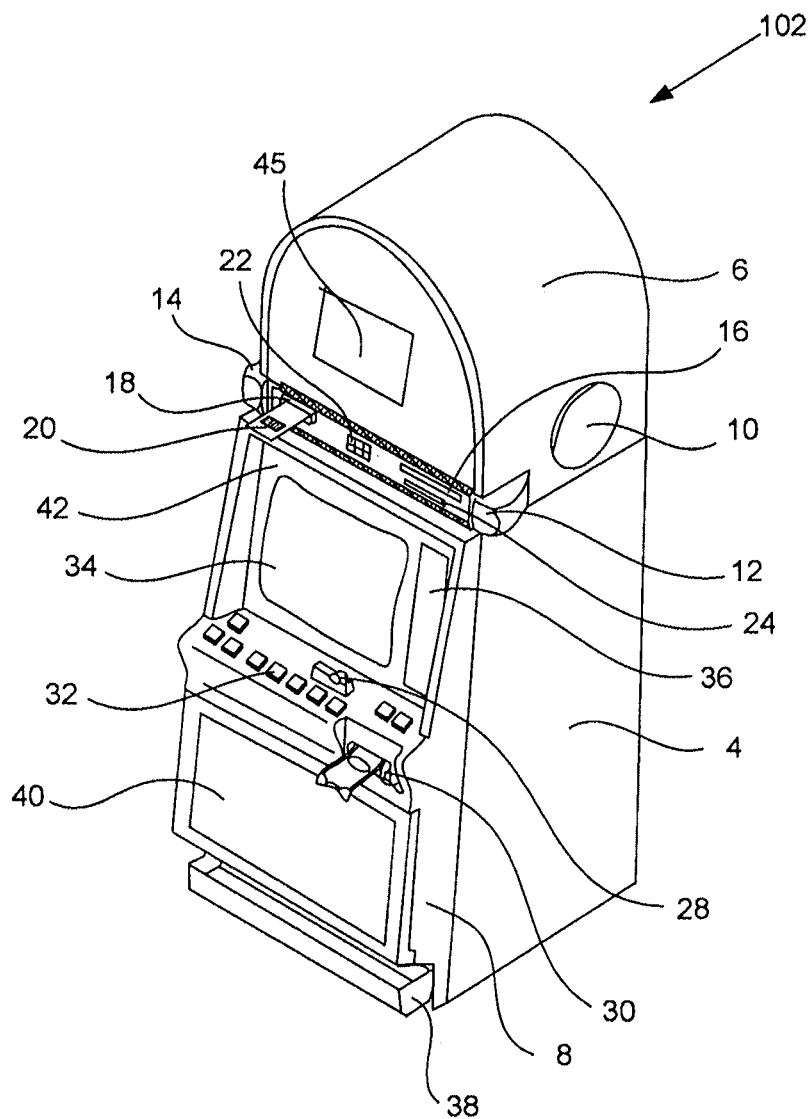
FIG. 4 illustrates a gaming device that may be used in accordance with various embodiments of the present invention.

Turning to FIG. 4, more details of gaming machine 102 are described. Machine 102 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the gaming machine 102. The devices are controlled by circuitry housed inside the main cabinet 4 of the machine 102.

The gaming machine 102 includes a top box 6, which sits on top of the main cabinet 4. The top box 6 houses a number of devices, which may be used to add features to a game being played on the gaming machine 102, including speakers 10, 12, 14, a ticket printer 18 which may print bar-coded tickets 20 used as cashless instruments. The player tracking unit mounted within the top box 6 includes a key pad 22 for entering player tracking information, a fluorescent display 16 for displaying player tracking information, a card reader 24 for entering a magnetic striped card containing player tracking information, a microphone 43 for inputting voice data, a speaker 42 for projecting sounds and a light panel 44 to display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 102 is but one example from a wide range of gaming machine designs on which the present invention may be implemented. For example, not all suitable gaming machines have top boxes or player tracking features. Further, some gaming machines have two or more game displays—mechanical and/or video—and, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present can be deployed on most gaming machines now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 4, when a user wishes to play the gaming machine 102, he or she inserts cash through the coin acceptor 28 or bill validator 30. In addition, the player may use a cashless instrument of some type to register credits on the gaming machine 102. For example, the bill validator 30 may accept a printed ticket voucher, including 20, as an indicium of credit. As another example, the card reader 24 may accept a debit card or a smart card containing cash or credit information that may be used to register credits on the gaming machine.

During the course of a game, a player may be required to make a number of decisions, which affect the outcome of the game. For example, a player may vary his or her wager on a particular game, select a prize for a particular game, or make game decisions regarding gaming criteria that affect the outcome of a particular game. The player may make these choices using the player-input switches 32, the video display screen 34 or using some other device which enables a player to input information into the gaming machine.

During certain game functions and events, the gaming machine 102 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 102, from lights behind the belly glass 40 or the light panel on the player tracking unit 44.

After the player has completed a game, the player may receive award credits, game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 102. In some embodiments, these tickets may be used by a game player to obtain game services.

One related method of gaining and maintaining a game player's interest in game play involves player tracking programs that are offered at various casinos. Player tracking programs provide rewards to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

Figure 5:
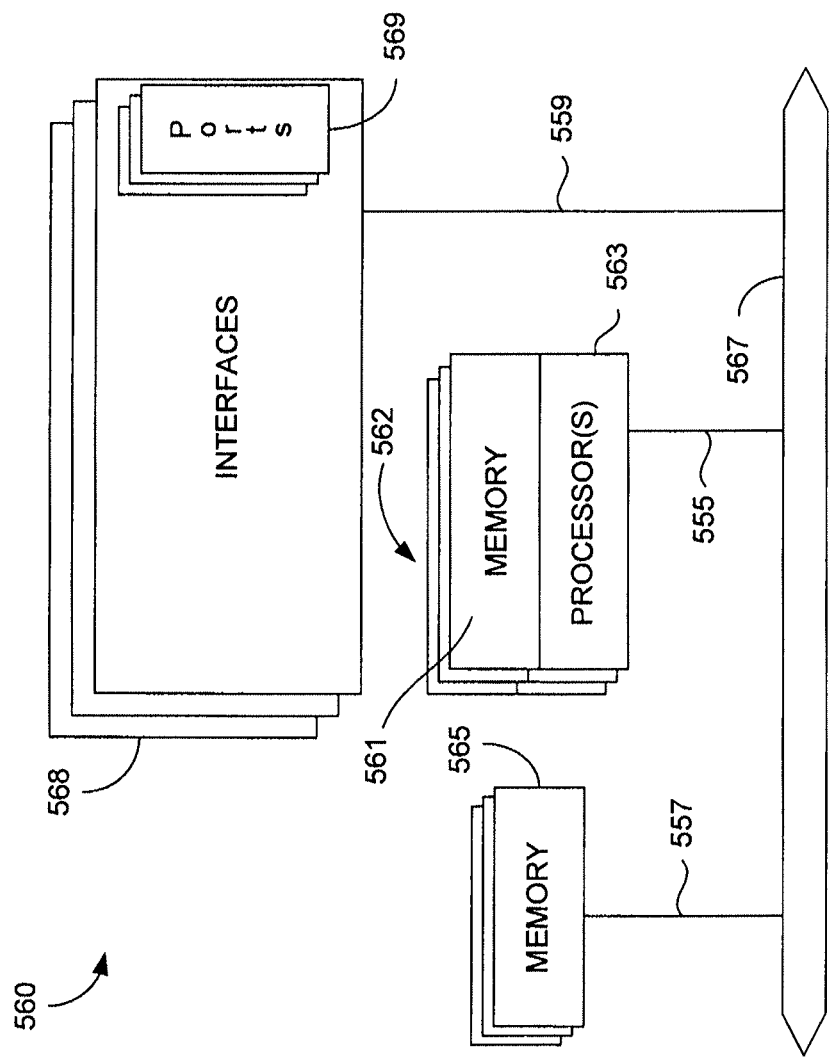
FIG. 5 is a block diagram of a network device that may be used to implement various embodiments of the present invention.

FIG. 5 illustrates an example of a network device that may be configured to implement some methods of the present invention. Network device 560 includes a master central processing unit (CPU) 562, interfaces 568, and a bus 567 (e.g., a PCI bus). Generally, interfaces 568 include ports 569 appropriate for communication with the appropriate media. In some embodiments, one or more of interfaces 568 includes at least one independent processor and, in some instances, volatile RAM. The independent processors may be, for example ASICs or any other appropriate processors. According to some such embodiments, these independent processors perform at least some of the functions of the logic described herein. In some embodiments, one or more of interfaces 568 control such communications-intensive tasks as media control and management. By providing separate processors for the communications-intensive tasks, interfaces 568 allow the master microprocessor 562 efficiently to perform other functions such as routing computations, network diagnostics, security functions, etc.

The interfaces 568 are typically provided as interface cards (sometimes referred to as "linecards"). Generally, interfaces 568 control the sending and receiving of data packets over the network and sometimes support other peripherals used with the network device 560. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 562 may be responsible for implementing specific functions associated with the functions of a desired network device. According to some embodiments, CPU 562 accomplishes all these functions under the control of software including an operating system and any appropriate applications software.

CPU 562 may include one or more processors 563 such as a processor from the Motorola family of microprocessors or the MIPS family of microprocessors. In an alternative embodiment, processor 563 is a specially designed hardware for controlling the operations of network device 560. In a specific embodiment, a memory 561 (such as non-volatile RAM and/or ROM) also forms part of CPU 562. However, there are many different ways in which memory could be coupled to the system. Memory block 561 may be used for a variety of purposes such as, for example, caching and/or storing data, programming instructions, etc.

Regardless of network device's configuration, it may employ one or more memories or memory modules (such as, for example, memory block 565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc., for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 5 illustrates one specific network device of the present invention, it is by no means the only network device architecture on which the present invention can be implemented. For example, an architecture having a single processor that handles communications as well as routing computations, etc., is often used. Further, other types of interfaces and media could also be used with the network device. The communication path between interfaces may be bus based (as shown in FIG. 5) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention. Conversely, the steps in some processes and/or components in some embodiments may be combined within the scope of the present invention. For example, some steps described herein as being performed by a progressive server could be performed, e.g., by a site controller or by one or more other networked devices.

While the invention has been particularly shown and described with reference to specific embodiments thereof, it will be understood by those skilled in the art that changes in the form and details of the disclosed embodiments may be made without departing from the spirit or scope of the invention. For instance, while the gaming machines of this invention have been depicted as having a top box mounted on top of the main gaming machine cabinet, the use of gaming devices in accordance with this invention is not so limited. For example, a gaming machine may be provided without a top box, or may have additional boxes or devices attached, or may be configured in bar tops, table tops, or other structures. Further, the location of the signature input devices on the gaming machine may vary widely in different embodiments. Additionally, the gaming network may be connected to other devices including other servers or gaming devices over the Internet or through other wired and wireless systems. Moreover, embodiments of the present invention may be employed with a variety of network protocols and architectures.

Thus, the examples described herein are not intended to be limiting of the present invention. It is therefore intended that the appended claims will be interpreted to include all variations, equivalents, changes and modifications that fall within the true spirit and scope of the present invention.

The invention is claimed as follows:

1. A gaming system comprising:
   at least one processor;
   at least one display device; and
   at least one memory device which stores a plurality of instructions, which when executed by the at least one processor, cause the at least one processor to:
   maintain a progressive award amount,
   select a target progressive award amount,
   responsive to a progressive award contribution event occurring, increment the maintained progressive award amount, and
   responsive to a progressive award triggering event occurring:
   determine a payout of the incremented progressive award amount, said determination being based, at least in part, on the incremented progressive award amount and the selected target progressive award amount, and
   cause the at least one display device to display the determined payout of the incremented progressive award amount.

2. The gaming system of claim 1, wherein when executed by the at least one processor, said plurality of instructions cause the at least one processor to:
   determine a first payout of the incremented progressive award amount if the incremented progressive award amount is a first value and a first target progressive award amount is selected, and
   determine a second, different payout of the incremented progressive award amount if the incremented progressive award amount is a second, different value and the first target progressive award amount is selected.

3. The gaming system of claim 1, wherein when executed by the at least one processor, said plurality of instructions cause the at least one processor to:
   determine a first payout of the incremented progressive award amount if the incremented progressive award amount is a first value and a first target progressive award amount is selected, and
   determine a second, different payout of the incremented progressive award amount if the incremented progressive award amount is the first value and a second, different target progressive award amount is selected.

4. The gaming system of claim 1, wherein when executed by the at least one processor, said plurality of instructions cause the at least one processor to determine the payout of the incremented progressive award amount based on an amount of a wager placed in association with the occurrence of the progressive award triggering event.

5. The gaming system of claim 1, wherein the selected target progressive award amount is a percentage of the maintained progressive award amount.

6. The gaming system of claim 1, which includes a housing, and a plurality of input devices supported by the housing, said plurality of input devices including: an acceptor, and a cashout device, wherein when executed by the at least one processor, the plurality of instructions cause the at least one processor to operate with the plurality of input devices to: responsive to a physical item being received via the acceptor, establish a credit balance based, at least in part, on a monetary value associated with the received physical item, and responsive to a cashout input being received via the cashout device, cause an initiation of any payout associated with the credit balance.

7. The gaming system of claim 1, wherein the determined payout of the incremented progressive award amount is at least one selected from the group consisting of: a quantity of monetary credits, a quantity of non-monetary credits, and a quantity of player tracking points.

8. A gaming system server comprising:
at least one processor; and
at least one memory device which stores a plurality of instructions, which when executed by the at least one processor, cause the at least one processor to:
maintain a progressive award amount,
select a target progressive award amount,
responsive to a progressive award contribution event occurring, increment the maintained progressive award amount, and
responsive to a progressive award triggering event occurring:
determine a payout of the incremented progressive award amount, said determination being based, at least in part, on the incremented progressive award amount and the selected target progressive award amount, and
cause at least one display device to display the determined payout of the incremented progressive award amount.

9. The gaming system server of claim 8, wherein when executed by the at least one processor, said plurality of instructions cause the at least one processor to:
determine a first payout of the incremented progressive award amount if the incremented progressive award amount is a first value and a first target progressive award amount is selected, and
determine a second, different payout of the incremented progressive award amount if the incremented progressive award amount is a second, different value and the first target progressive award amount is selected.

10. The gaming system server of claim 8, wherein when executed by the at least one processor, said plurality of instructions cause the at least one processor to:
determine a first payout of the incremented progressive award amount if the incremented progressive award amount is a first value and a first target progressive award amount is selected, and
determine a second, different payout of the incremented progressive award amount if the incremented progressive award amount is the first value and a second, different target progressive award amount is selected.

11. The gaming system server of claim 8, wherein when executed by the at least one processor, said plurality of instructions cause the at least one processor to determine the payout of the incremented progressive award amount based on an amount of a wager placed in association with the occurrence of the progressive award triggering event.

12. The gaming system server of claim 8, wherein the selected target progressive award amount is a percentage of the maintained progressive award amount.

13. The gaming system server of claim 8, wherein the determined payout of the incremented progressive award amount causes an increase of a credit balance which is increasable via an acceptor of a physical item associated with a monetary value, and decreasable via a cashout device.

14. The gaming system server of claim 8, wherein the determined payout of the incremented progressive award amount is at least one selected from the group consisting of: a quantity of monetary credits, a quantity of non-monetary credits, and a quantity of player tracking points.

15. A method of operating a gaming system, said method comprising:
maintaining, by at least one processor, a progressive award amount,
selecting a target progressive award amount,
responsive to a progressive award contribution event occurring, incrementing, by the at least one processor, the maintained progressive award amount, and
responsive to a progressive award triggering event occurring:
determining, by the at least one processor, a payout of the incremented progressive award amount, said determination being based, at least in part, on the incremented progressive award amount and the selected target progressive award amount, and
causing at least one display device to display the determined payout of the incremented progressive award amount.

16. The method of claim 15, further comprising:
determining, by the at least one processor, a first payout of the incremented progressive award amount if the incremented progressive award amount is a first value and a first target progressive award amount is selected, and
determining, by the at least one processor, a second, different payout of the incremented progressive award amount if the incremented progressive award amount is a second, different value and the first target progressive award amount is selected.

17. The method of claim 15, further comprising:
determining, by the at least one processor, a first payout of the incremented progressive award amount if the incremented progressive award amount is a first value and a first target progressive award amount is selected, and
determining, by the at least one processor, a second, different payout of the incremented progressive award amount if the incremented progressive award amount is the first value and a second, different target progressive award amount is selected.

18. The method of claim 15, further comprising determining, by the at least one processor, the payout of the incremented progressive award amount based on an amount of a wager placed in association with the occurrence of the progressive award triggering event.

19. The method of claim 15, wherein the selected target progressive award amount is a percentage of the maintained progressive award amount.

20. The method of claim 15, wherein the determined payout of the incremented progressive award amount causes an increase of a credit balance which is increasable via an acceptor of a physical item associated with a monetary value, and decreasable via a cashout device.

21. The method of claim 15, wherein the determined payout of the incremented progressive award amount is at least one selected from the group consisting of: a quantity of monetary credits, a quantity of non-monetary credits, and a quantity of player tracking points.

22. The method of claim 15, which is provided via a data network.

23. The method of claim 22, wherein the data network is an internet.

* * * * *